(12) United States Patent
Nishikiori et al.

(10) Patent No.: US 6,887,547 B2
(45) Date of Patent: May 3, 2005

(54) OPTICAL INFORMATION RECORDING MEDIUM

(75) Inventors: Keiji Nishikiori, Yawata (JP); Eiji Ohno, Hirakata (JP)

(73) Assignee: Matsushita Electrical Industrial Co., Ltd., Osaka (JP)

( * ) Notice: Subject to any disclaimer, the term of this patent is extended or adjusted under 35 U.S.C. 154(b) by 0 days.

(21) Appl. No.: 10/688,146

(22) Filed: Oct. 16, 2003

(65) Prior Publication Data

US 2004/0091814 A1 May 13, 2004

(30) Foreign Application Priority Data

Oct. 18, 2002 (JP) ........................................ 2002-304793

(51) Int. Cl.⁷ .................................................. B32B 3/02
(52) U.S. Cl. .................... 428/64.1; 428/64.4; 428/64.5; 430/270.12
(58) Field of Search ............................... 428/64.1, 64.4, 428/64.5, 64.6, 913; 430/270.12, 270.13, 945.1

(56) References Cited

U.S. PATENT DOCUMENTS

| | | | |
|---|---|---|---|
| 5,846,626 A | | 12/1998 | Kashiwagi et al. |
| 6,083,597 A | * | 7/2000 | Kondo ........................ 428/64.1 |
| 6,309,726 B1 | * | 10/2001 | Ono et al. ................... 428/64.1 |
| 6,576,320 B2 | * | 6/2003 | Hayashida et al. ......... 428/64.1 |
| 6,636,476 B1 | * | 10/2003 | Arakawa et al. ............ 369/283 |
| 6,667,952 B2 | * | 12/2003 | Komaki et al. .......... 369/275.5 |
| 2002/0132082 A1 | * | 9/2002 | Hendriks .................... 428/64.4 |
| 2003/0223350 A1 | * | 12/2003 | Takazawa ................... 369/286 |

FOREIGN PATENT DOCUMENTS

| JP | 8-235638 | 9/1996 |
|---|---|---|
| JP | 10-283683 | 10/1998 |

* cited by examiner

*Primary Examiner*—Elizabeth Mulvaney
(74) *Attorney, Agent, or Firm*—Merchant & Gould P.C.

(57) ABSTRACT

An optical information recording medium of the present invention includes: a substrate with at least one selected from the group consisting of a groove and a pit formed on one surface thereof; at least one information layer provided on the surfaces of the substrate, the information layer including at least one selected from the group consisting of a recording film and a reflective film; a resin layer provided on the information layer; and a light transmission layer provided on the resin layer. The resin layer includes a first resin film and a second resin film disposed in this order from the side of the light transmission layer, and when a water absorption rate of the first resin film is represented by A1 and a water absorption rate of the second resin film is represented by A2, A1 and A2 satisfy: A1>A2. The first resin film and the second resin film may have a different flexural modulus of elasticity.

26 Claims, 4 Drawing Sheets

OPTICAL INFORMATION RECORDING MEDIUM

BACKGROUND OF THE INVENTION

1. Field of the Invention

The present invention relates to an optical information recording medium.

2. Related Background Art

In recent years, in the field of an information recording medium, studies on various types of optical information recording media have been carried out. Optical information recording media are being applied to a wide variety of applications as a medium with respect to which information can be recorded and reproduced with high density, in a non-contact mode and at a low cost.

In particular, a Digital Versatile Disk (DVD), which is a large capacity optical information recording medium with respect to which information including not only audio data but also a motion picture such as a movie can be recorded and reproduced, has been widespread in the market.

At present, an optical information recording medium typified by a DVD has a structure in which an information layer is provided on a 1.2 mm thick transparent resin substrate and further a light transmission layer is provided to protect the information layer, or a structure in which an information recording layer is provided on at least one of the surfaces of a 1.2 mm thick transparent resin substrate and they are adhered to each other.

Furthermore, in recent years, in order to achieve high-density recording, an optical information recording medium using a short wavelength laser for recording and reproducing information and an optical information recording medium using an objective lens having a large numerical aperture (NA) are proposed as well (see, for example, JP8 (1996)-235638 A and JP10 (1998)-283683 A).

The size of a recorded mark of an optical information recording medium is proportional to the size of a light spot. Since the size of a recorded mark can be reduced by reducing the size of a light spot, the recording density can be improved. The size of a light spot is determined by $\lambda/NA$, where $\lambda$ denotes a wavelength of irradiated laser beams. That is to say, by increasing NA, high-density recording can be achieved.

There may arise a problem that when NA is increased, a margin with respect to a tilt of the optical information recording medium is reduced. However, this margin can be widened by reducing the thickness of a light transmission layer.

As a method for thinning the thickness of the light transmission layer, there has been proposed a method of adhering a resin film formed by a casting method to the information layer with a UV curable adhesive or an acrylic pressure sensitive adhesive.

FIG. 7 is a cross-sectional view showing a conventional optical information recording medium 10. The optical information recording medium 10 has a configuration in which a substrate 101 with grooves for information recording (not shown) formed on the surface thereof, an information recording layer 102 provided on the surface provided with grooves of the substrate 101, an adhesive layer 103 and a light transmission layer 104 made of a resin film are laminated. As mentioned above, by reducing the thickness of the light transmission layer 104, the margin with respect to the tilt of the optical information recording medium can be increased, thus enabling high-density recording to be realized.

However, when the resin film is used for the light transmission layer and this resin film is adhered to the information layer with an adhesive, there arise the following problems.

An adhesive is a material that requires high adhesion force, however, such a material usually has a porous structure and absorbs water easily. Therefore, when such a material is exposed to high humidity, it absorbs water, which causes a problem that an information layer corrodes or that a tilt occurs in a medium due to a deformation such as a warp. Furthermore, since such an adhesive makes it difficult to diffuse heat effectively, if heat is generated by the irradiation of laser beams at the time of recording/reproducing information, the information layer is damaged by the heat, which may reduce the number of recording/reproducing cycles or reduce reflectance. Furthermore, there arises a problem that a tilt occurs due to a heat deformation of a resin layer.

SUMMARY OF THE INVENTION

A first optical information recording medium of the present invention includes is a substrate with at least one selected from the group consisting of a groove and a pit formed on one surface thereof, at least one information layer provided on the surfaces of the substrate, the information layer including at least one selected from the group consisting of a recording film and a reflective film; a resin layer provided on the information layer; and a light transmission layer provided on the resin layer. The resin layer includes a first resin film and a second resin film disposed in this order from the side of the light transmission layer, and when a water absorption rate of the first resin film is represented by A1 and a water absorption rate of the second resin film is represented by A2, A1 and A2 satisfy: A1>A2.

A second optical information recording medium of the present invention includes a substrate with at least one selected from the group consisting of a groove and a pit formed on one surface thereof; at least one information layer provided on the surfaces of the substrate, the information layer including at least one selected from the group consisting of a recording film and a reflective film; a resin layer provided on the information layer; and a light transmission layer provided on the resin layer. The resin layer includes a first resin film and a second resin film disposed in this order from the side of the light transmission layer, and when the flexural modulus of elasticity of the first resin film is represented by D1 and the flexural modulus of elasticity of the second resin film is represented by D2, D1 and D2 are different from each other.

DESCRIPTION OF THE PREFERRED EMBODIMENTS

Figure 1:
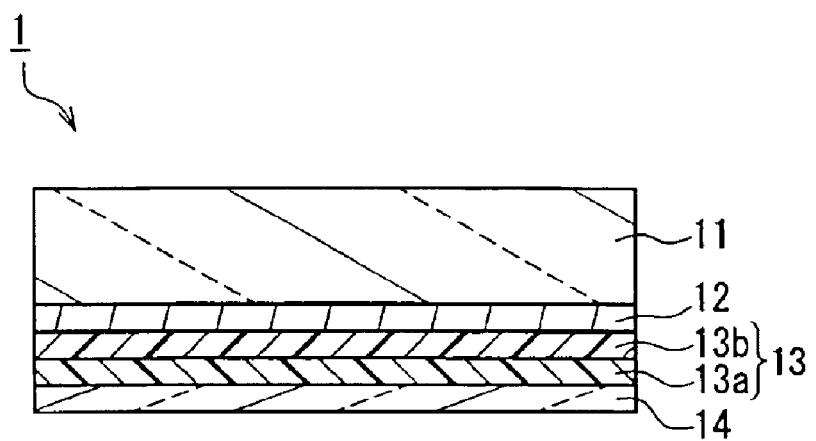
FIG. 1 is a cross-sectional view showing a configuration of an optical information recording medium according to a first embodiment of the present invention.

In a first optical information recording medium of the present invention, a resin layer for adhering an information layer and a light transmission layer to each other includes a first resin film and a second resin film that has a water absorption rate smaller than that of the first resin film. Since the second resin film having a smaller water absorption rate is provided at the side of the information layer, the information layer is not likely to be exposed to water, and thus the corrosion of the information layer can be suppressed. Furthermore, it is possible to prevent a deformation such as a warp, etc. due to the absorption of water and also to suppress the occurrence of a tilt.

In the first optical information recording medium of the present invention, the difference between the water absorption rate A1 of the first resin film and the water absorption rate A2 of the second resin film is preferably 1 wt. % to 20 wt. % and more preferably 1 wt. % to 10 wt. %.

In the first optical information recording medium of the present invention, for the first resin film, for example, an acrylic pressure-sensitive adhesive or an epoxy pressure-sensitive adhesive can be used. Specifically, an acrylic pressure-sensitive adhesive containing polybutyl acrylate or polymethyl acrylate as a main component can be used. Furthermore, for the second resin film, an ultraviolet curable resin, for example, a material in which methacrylate and a photopolymerization agent are contained as a main component and an acrylate resin or a polyester resin is mixed as a binder, can be used.

In the first optical information recording medium of the present invention, it is preferable that the water absorption rate A2 of the second resin film is 10 wt. % or less. It is advantageous because it is possible to suppress corrosion in the information recording layer and the occurrence of a tilt more effectively.

In the first optical information recording medium of the present invention, it is preferable that the second resin film is provided so as to cover the end face of the information layer, and more preferably, the distance W between the end face of the second resin film and the end face of the information layer is 0.2 mm or more. It is advantageous because it is possible to suppress the occurrence of corrosion in the information recording layer more effectively.

In the first optical information recording medium of the present invention, when the flexural modulus of elasticity of the first resin film is represented by D1 and the flexural modulus of elasticity of the second resin film is represented by D2, D1 and D2 may be different from each other. In this case, it is preferable that the flexural modulus of elasticity D1 of the first resin film and the flexural modulus of elasticity D2 of the second resin film satisfy: D2>D1. It is advantageous because heat can be diffused effectively, so that the damage of the information layer because of heat, etc. can be suppressed and thus the recording/reproducing cycle property can be improved (in the case of reproduction-only type media, the reduction in the reflection rate can be suppressed).

In the second optical information recording medium of the present invention, since the resin layer for adhering the information layer and the light transmission layer to each other includes the first resin film and the second resin film, each having different flexural modulus of elasticity, the heat diffusion effect of the resin layer is improved and the damage of the information layer due to heat or a heat deformation of the medium can be prevented. Thus, the recording/reproducing cycle property can be improved (in the case of the reproduction-only type media, the reduction in the reflection rate can be suppressed). Furthermore, it is possible to prevent the occurrence of a tilt as well.

In the second optical information recording medium of the present invention, it is preferable that the flexural modulus of elasticity D1 of the first resin film and the flexural modulus of elasticity D2 of the second resin film satisfy: D2>D1. It is advantageous because the recording/reproducing cycle property can be improved further.

In the second optical information recording medium of the present invention, it is preferable that the flexural modulus of elasticity D2 of the second resin film is $3 \times 10^5$ Pa or more. It is advantageous because it is possible to suppress the occurrence of a tilt due to a heat deformation more effectively.

In the second optical information recording medium of the present invention, it is preferable that the difference in the flexural modulus of elasticity between the first resin film and the second resin film is $1 \times 10^5$ Pa or more and $1 \times 10^7$ Pa or less. It is advantageous because it is possible to improve the recording/reproducing cycle property further.

In the first and second optical information recording medium of the present invention, the thickness of the transmission layer can be made 100 μm or less. Thus, it is possible to achieve the high-density recording by increasing NA.

In the first and second optical information recording medium of the present invention, the second resin film may include at least an ultraviolet curable resin. It is advantageous because the water absorption rate and the flexural modulus of elasticity of the second resin film can be controlled to the desired values.

In the first and second optical information recording medium of the present invention, the information layer includes a first protective film, the recording film, a second protective film and the reflective film disposed in this order from the side in which a laser beam is incident, the first protective film includes ZnS, and the second resin film may be provided in contact with the first protective film. Even when the recording/reproducing type medium in which the first protective film containing ZnS is provided, it is possible to prevent the corrosion of the information layer or the deterioration of the recording/reproducing cycle property. Containing ZnS means that 20 wt. % or more and preferably 40 wt. % or more of ZnS is contained.

In the first and second optical information recording medium of the present invention, a pit is formed on the surface of the substrate, the information layer is made of the reflective film including at least one selected from the group consisting of Ag, Al and Si as a main component, and the second resin film is provided in contact with the reflective film. Even in a reproducing-only type optical information recording medium, it is possible to prevent the corrosion of the information layer and the reduction in the reflectance of the reflective film due to heat damage.

In the first and second optical information recording medium of the present invention, it is preferable that when the thickness of the first resin film is represented by H1 and the thickness of the second resin film is represented by H2, H1 and H2 satisfy: H1>H2. More preferably, the thickness H2 of the second resin film is 0.2 $\mu$m or more and 0.5 $\mu$m or less. It is advantageous because when H2 is set at 0.2 $\mu$m or more, the effect of the present invention can be obtained sufficiently. Furthermore, when H2 is set at 5 $\mu$m or less, the inconsistency in thickness is not likely to occur even if the second resin film is formed by spin coating.

In the first and second optical information recording medium of the present invention, it is preferable that the second resin film is formed by spin coating. It is advantageous because the second resin film can be formed with uniform thickness.

In the first and second optical information recording medium of the present invention, a plurality of information layers may be provided between the substrate and the resin layer. Thus, it is possible to achieve a large capacity.

Hereinafter, the present invention will be explained by way of embodiments with reference to the drawings.

(First Embodiment)

One embodiment of the optical information recording medium of the present invention will be explained. FIG. 1 is a cross-sectional view showing a configuration of an optical information recording medium 1 according to a first embodiment of the present invention.

In the optical information recording medium 1 of this embodiment, on the substrate 11, an information layer 12 including a recording film, a resin layer 13 and a light transmission layer 14 are laminated in this order. The resin layer 13 is formed of a first resin film 13a and a second resin film 13b, which are disposed in this order from the side of the light transmission layer 14. That is to say, the resin layer 13 has a two-layered structure including the first resin film 13a provided in contact with the light transmission layer 14 and the second resin film 13b provided in contact with the information layer 12. The information layer 12 and the light transmission layer 14 are adhered to each other with the resin layer 13. Note here that the optical information recording medium 1 has a configuration in which a laser beam is incident from the side of the light transmission layer 14.

For the substrate 11, it is possible to use, for example, a polycarbonate substrate, etc. on the surface of which at least one selected from a groove and a pit is formed by injection molding.

The information layer 12 includes a recording film. For example, the information layer 12 is formed by laminating a reflective film, a second protective film, a recording film and a first protective film in this order from the side of the substrate 11. The recording film is, for example, a phase change type recording film formed of a material that is changed in phase reversibly between a crystalline phase and an amorphous phase by the irradiation of laser beams. The first protective film positioned at the side on which a laser beam is incident can be formed of a material containing ZnS as a main component, for example, a mixed material of ZnS and $SiO_2$.

The light transmission layer 14 is formed thinly so as to correspond to high-density recording by using an objective lens with a large NA. The thickness of the light transmission layer 14 is preferably 300 nm or less and more preferably 100 $\mu$m or less.

It is preferable that the first resin film 13a is formed of a resin having a relatively high viscosity (for example, viscosity of 1 mPa·s to 100 mPa·s) because it is required to have an adhesiveness with respect to the light transmission layer 14. Therefore, for the first resin film 13a, for example, an acrylic pressure-sensitive adhesive or an epoxy pressure-sensitive adhesive and the like can be used. In particular, it is preferable to use an acrylic pressure-sensitive adhesive containing polybutyl acrylate or polymethyl acrylate as a main component. Note here that such materials have relatively high water absorption rate as a nature of the material, however, it is preferable that the water absorption rate A1 of the first resin film 13a is in the range from 5 wt. % to 30 wt. %. Herein, the water absorption rate of the first resin film 13a means a percentage of an amount of absorbed water to the dry weight of the first resin film 13a. Specifically, a sample of the first resin film 13a from which a protective film or a separating film is peeled off was dried in an oven at 60° for 24 hours and then the sample was cooled in a desiccator for 2 hours. At this time, dry weight of the sample was measured. Thereafter, the sample was dipped in distilled water of 23±1° C. for 2 hours. Then, the sample was taken out of the distilled water and wiped off to remove water, and then the sample in this state was measured. By comparing the weight of the sample before dipping with the weight of the sample after dipping so as to calculate the increased weight, the water absorption rate was measured. The water absorption rate A2 of the second resin film 13b is measured by the same method.

Furthermore, since the first resin film 13a needs to have a relatively strong adhesive force, preferably the thickness H1 is 10 $\mu$m or more. Furthermore, the film thickness should not be made extremely thick in order for the first resin film 13a to have a uniform thickness, and preferably the thickness H1 is 40 $\mu$m or less.

The second resin film 13b is formed of a material in which the water absorption rate A2 of the second resin film 13b is smaller than the absorption rate A1 of the first resin film 13a (a material satisfying A1>A2). For the second resin film 13b, it is preferable to use an ultraviolet curable resin such as an acrylic based resin, etc. because the water absorption rate can be changed relatively easily. As a specific example, a material in which methacrylate and a photopolymerization agent are contained as a main component and an acrylate resin or a polyester resin is mixed as a binder can be used. Furthermore, the second resin film 13b can be formed when the thickness H2 of the second resin film 13b is in the range from 0.1 $\mu$m to 20 $\mu$m, but the preferable thickness H2 is in the range from 0.2 $\mu$m to 5 $\mu$m. It is advantageous because when H2 is 0.2 $\mu$m or more, the effect of the low absorption rate of the second resin film 13b can be obtained sufficiently and when H2 is 5 $\mu$m or less, inconsistency in the thickness does not tend to occur even if the second resin film 13b is formed by spin coating.

Figure 6:
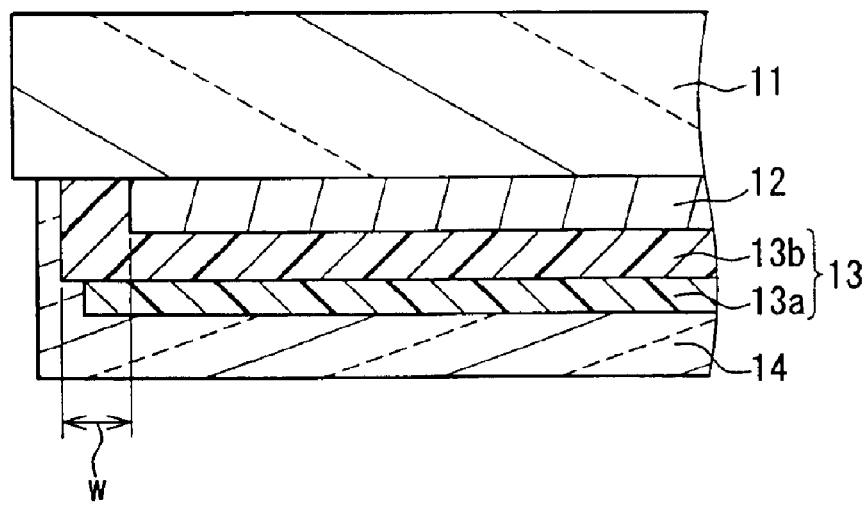
FIG. 6 is a view for explaining the distance W between the end face of a second resin film and the end face of an information layer.

FIG. 6 is a view to explain the distance W between the end face of the second resin film 13b and the end face of the information layer 12. Furthermore, it is preferable that the second resin film 13b is provided so as to cover the end face of the information layer 12. It is preferable that the distance W from the end face of the information layer 12 to the end face of the second resin film 13b is 0.2 mm or more. It is advantageous because it is possible to suppress corrosion in the information layer 12 effectively.

As mentioned above, in the optical information recording medium 1 of this embodiment, the resin layer 13 for adhering the information layer 12 and the light transmission layer 14 to each other is formed of the first resin film 13a and the second resin film 13b, a material capable of keeping a high adhesiveness with respect to the light transmission layer 14 is used for the first resin film 13a, and a material with a low water absorption rate is used for the second resin 13b. When a resin with a high viscosity is used in order to provide a high adhesiveness, the water absorption rate of the material becomes relatively high, so that the information layer is exposed to water due to the absorption of water. In this embodiment, however, since the second resin film 13b with a low water absorption rate is provided in a manner in which it is brought into contact with the information layer 12, it is possible to suppress the degree to which the information layer 12 is exposed to water. Thus, it is possible to prevent the information layer 12 from being corroded. Furthermore, it is possible to prevent the deformation such as a warp, etc. in the medium due to the absorption of water and also to suppress the occurrence of a tilt.

Furthermore, in order to suppress the corrosion of the information layer 12 and the occurrence of a tilt effectively, it is preferable that the water absorption rate A2 of the second resin film 13b is set at 10 wt. % or less.

Furthermore, when a first protective film containing ZnS is provided in the information layer 12, the protective film itself is reformed to have a porous surface under conditions of high temperature and high humidity, so that water is likely to penetrate the protective layer to thus corrode the recording film. On the other hand, in the optical information recording medium 1 of this embodiment, since the second resin film 13b with a low water absorption rate is provided so as to cover the first protective film, it is possible to prevent the first protective film itself from being reformed and to solve the above-mentioned problems. That is, the optical information recording medium 1 of this embodiment can exhibit a particularly large effect when the information layer 12 has a protective film formed of a ZnS-based material.

Next, the method for manufacturing an optical information recording medium 1 of this embodiment will be explained. First of all, on the substrate 11, a reflective film, a second protective film, a recording film and a first protective film are formed in this order by a sputtering method. Next, on the first protective film, the second resin film 13b is formed. Since the second resin film 13b is required be formed thinly, preferably it is formed by spin coating. Next, on the second resin film 13b, the first resin film 13a is formed and further the light transmission layer 14 is formed. Thus, the optical information recording medium 1 can be formed. Furthermore, when the light transmission layer 14 is formed extremely thinly, it is preferable to coat the first resin film 13a on the light transmission layer 14 in advance by using a method such as a gravure printing, followed by carrying out a method for adhering the second resin film 13b formed on the side of the substrate 11 and the first resin film 13a formed on the side of the light transmission layer 14 to each other. It is advantageous because the film formation becomes easy.

(Second Embodiment)

Figure 2:
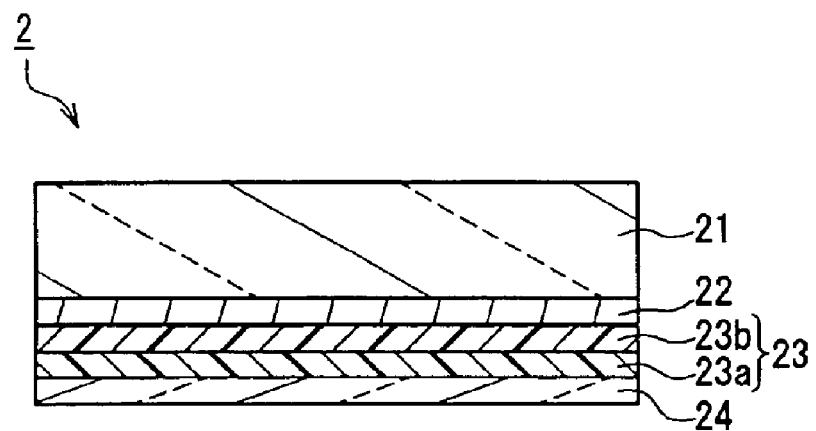
FIG. 2 is a cross-sectional view showing a configuration of an optical information recording medium according to a second embodiment of the present invention.

Another embodiment of the optical information recording medium of the present invention will be explained. FIG. 2 is a cross-sectional view showing a configuration of an optical information recording medium 2 according to the second embodiment.

In the optical information recording medium 2 of this embodiment, on the substrate 21, an information layer 22 including a recording film, a resin layer 23 and a light transmission layer 24 are laminated in this order. The resin layer 23 is formed of a first resin film 23a and a second resin film 23b, which are disposed in this order from the side of the light transmission layer 24. That is to say, the resin layer 23 has a two-layered structure including the first resin film 23a provided in contact with the light transmission layer 24 and the second resin film 23b provided in contact with the information layer 22. The information layer 22 and the light transmission layer 24 are adhered to each other with the resin layer 23. Note here that the optical information recording medium 2 has a configuration in which a laser beam is incident from the side of the light transmission layer 24.

The substrate 21, the information layer 22 and light transmission layer 24 can be formed by using the same materials as those used for the substrate 1, the information layer 12 and the light transmission layer 14 described in the first embodiment and can be formed in the same shape as in the first embodiment. Furthermore, the functions of the respective layers are the same.

The resin layer 23 is formed of a first resin film 23a and a second resin film 23b each having a different flexural modulus of elasticity. In a conventional optical information recording medium, in recording and reproducing, when one place is irradiated with a laser beam for a long time, heat is generated, which causes the heat deformation of the resin layer or the change in the refractive index in the interface between the information layer and the resin layer. As a result, much heat damage is applied to the information layer and an excellent recording/reproducing cycle property cannot be obtained. On the other hand, since in the optical information recording medium 2 of this embodiment, the resin layer 23 is formed by laminating resin films each having a different flexural modulus of elasticity, the resin layer 23 is not likely to be damaged by a laser beam. In detail, a resin layer 23 is formed of the first resin film 23a that can keep a pressure-sensitive adhesive component even under heat damage and the second resin film 23b that is not likely to be heat damaged because the flexural modulus of elasticity is high, their respective functions are separated from each other (respective functions are carried out by different films). Furthermore, the heat of the laser film is absorbed by the first resin film 23a, so that the heat damage to the second resin film 23b is reduced. Thus, it is possible to obtain a more excellent recording/reproducing cycle property as compared with that of a conventional optical information recording medium.

The first resin film 23a can be formed of, for example, an acrylic pressure-sensitive material containing polybutyl acrylate or polymethyl acrylate as a main component. The second resin film 23b can be formed of an ultraviolet curable resin containing, for example, methacrylate and a photopolymerization agent as a main component. The difference between the flexural modulus of elasticity D1 of the first resin film 23a and the flexural modulus of elasticity D2 of the second resin film 23b is preferably in the range from $1 \times 10^5$ Pa to $1 \times 10^7$ Pa, and more preferably in the range from $2 \times 10^5$ Pa to $2 \times 10^6$ Pa. It is advantageous because by selecting the flexural modulus of elasticity in the range mentioned above, the heat damage can be improved radically.

Furthermore, the flexural modulus of elasticity D1 of the first resin film 23a and the flexural modulus of elasticity D2 of the second resin film 23b may satisfy either D1>D2 or D1<D2. However, in order to allow heat to be diffused easily, it is preferable to satisfy D1<D2. Thus, the recording/reproducing cycle property can be improved further.

Note here that the second embodiment is the same as the first embodiment in that the first resin film 23a needs to have an adhesion with respect to the light transmission layer 24 and such a material is preferably used. Also the respective preferable thicknesses of the first resin film 23a and the second resin film 23b are the same in both embodiments. Furthermore, the optical information recording medium 2 can be formed by the same process as in the optical information recording medium 1 of the first embodiment.

In the first and second embodiments mentioned above, the recording/reproducing type optical information recording medium in which the recording film is provided in the information layer was explained. However, the same effect can be obtained in a reproduction-only type optical information recording medium in which information signals are formed on the substrate as concave and convex pits and the information layer is made of a reflective layer. Note here that when the optical information recording medium 2 of the second embodiment has a reproduction-only type configuration, instead of the effect of improving the recording/reproducing cycle property, the effect of suppressing the reduction in the reflectance due to heat damage to the reflective film can be obtained.

Furthermore, even if, for example, the information layer has a multilayer structure in which two layers or more of the information layers are laminated, the same effect can be obtained by allowing the resin layer provided between a plurality of laminated information layer group and the light transmission layer to have the same configuration as in the first and second embodiments.

Note here that the present invention is not particularly limited to the above-mentioned embodiments and may be applied to other embodiments based on the technical idea of the present invention.

EXAMPLES

Hereinafter, the optical information recording medium of the present invention will be explained in more detail by way of Examples.

Example 1

In Example 1, an optical information recording medium 1 according to the first embodiment was manufactured.

For a substrate 11, a polycarbonate substrate having a diameter of 120 mm and a central diameter of 10 mm was used. On one surface of this polycarbonate substrate, grooves were formed. An information layer 12 was formed of a reflective film (Ag—Pb—Co, thickness: 20 nm), a second protective film (ZnS—SiO$_2$, thickness: 20 nm), a recording film (Ge—As—Tb, 20 nm) and a first protective film (ZnS—SiO$_2$, thickness: 20 nm). A light transmission layer 14 was formed of a polycarbonate to the thickness of 78 μm. The first resin film 13a was formed of polymethyl acrylate so that a water absorption rate A1 was 10 wt. % and the thickness H1 was 20 μm. The second resin film 13b was formed of an ultraviolet curable resin so that a water absorption rate A2 was 0.7 wt. % and the thickness H2 was 1 μm. Herein, the ultraviolet curable resin contains 22 mol % of ethylene oxide modified bisphenol A-diacrylate, 30 mol % of tetrahydrofurfuryl acrylate and 25 mol % of dicyclopentenyl oxyethyl methacrylate as a main agent; 18 mol % of polyurethane diacrylate as a binder; and hydroxy cyclohexyl phenyl ketone as a photopolymerization agent.

Furthermore, the second resin film 13b was formed so as to cover the end face of the information layer 12 so that the end face of the second resin film 13b is positioned at the outer periphery side of the end face of the information layer 12 by about 1.0 mm.

Figure 7:
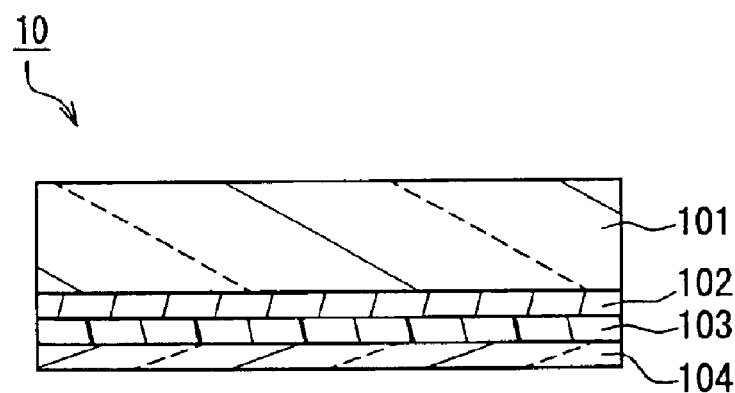
FIG. 7 is a cross-sectional view showing a configuration of a conventional optical information recording medium.

A sample 1-a of the optical information recording medium 1 manufactured in this way was subjected to a corrosion test. The corrosion test was carried out as follows. The condition was set by arrhenius plot so that the optical information recording medium 1 had the condition equivalent to aging of 10 to 20 years and the sample was left at a temperature of 90° C. at humidity of 80% for 100 hours, and then the number of corrosion was counted by visual inspection under a microscope. Furthermore, for comparison, a sample 1-b (corresponding to a conventional optical information recording medium 10 (see FIG. 7)) that was similar to the above-mentioned sample 1-a except that the second resin film 13b was not included was prepared and subjected to the corrosion test similarly. Table 1 shows the results of the corrosion test. Note here that in the corrosion test, five pieces per each sample 1-a and 1-b were prepared and these five samples were measured.

TABLE 1

| Sample No. | Number of corrosion (point) | |
|---|---|---|
| | Information surface (recording film) | End face of information layer |
| 1-a | 0 | 0 |
| 1-b | 3–5 | 2 |

As shown in Table 1, in the comparison sample 1-b, spot-like corrosion occurred on the surface of the recording film and in the depth direction (inside), and furthermore corrosion occurred also on the end face of the information layer. The sample 1-b was not able to record and reproduce signals because of the occurrence of such corrosion. On the other hand, in the sample 1-a, no corrosion occurred.

From the results mentioned above, it was confirmed that by providing the second resin film 13b, an excellent corrosion resistance property was obtained.

Example 2

In Example 2, an optical information recording medium 1 according to the first embodiment was manufactured.

In this example, samples 2-a to 2-i (five per each sample) were prepared in the same manner as in the sample 1-a of Example 1 except for the water absorption rate of the second resin film 13b. The water absorption rate A2 of the second resin film is shown in Table 2. Note here that the water absorption rate of the second resin film 13b was controlled so as to have a predetermined value by selecting a material of an acrylate resin used as a binder in the second resin film 13b.

These samples 2-a to 2-i were subjected to the corrosion test in the same manner as in Example 1. Table 2 shows the relationship between the water absorption rate of the second resin film 13b and corrosion. Note here that since the corrosion occurred in a circular shape in general, in table 2, the number of corrosion having a size of 50 μm or smaller in diameter and the number of corrosion having a size of 50 μm or larger in diameter are shown.

TABLE 2

| Sample No. | Water absorption rate (wt. %) | Number of corrosion (point) | |
|---|---|---|---|
| | | Smaller than 50 μm in diameter | 50 μm or larger in diameter |
| 2-a | 20 | 5–9 | 4–8 |
| 2-b | 16 | 5–7 | 3–6 |
| 2-c | 15.1 | 4–7 | 3–5 |
| 2-d | 12 | 3–6 | 1–2 |
| 2-e | 10.5 | 1–2 | 1 |
| 2-f | 10 | 0 | 0 |
| 2-g | 6.9 | 0 | 0 |
| 2-h | 4.3 | 0 | 0 |
| 2-I | 0.7 | 0 | 0 |

From the results, it was confirmed that by further reducing the water absorption rate of the second resin film 13b, a more excellent corrosion resistance was obtained. It was confirmed that by allowing the water absorption rate to be 10% or less, a clearer effect was obtained and the corrosion resistance was improved.

Furthermore, as to the samples 2-a to 2-h, the amount of change in tilt due to humidity also was measured, respectively. Table 3 shows the water absorption rate and the amount of change in tilt due to humidity. The tilt due to humidity shows the amount of change in tilt when the samples are shifted from a state in which water is sufficiently absorbed to a state of a general environment. Table 3 shows that the amount of change in tilt was changed depending on the water absorption rate of the second resin film 13b but when the water absorption rate was 10 wt. % or less, the amount of change was constantly 0.12°. This is because the water absorption rate of the second resin film 13b is low and less water was released. Similarly, when the amount of change in tilt was measured with respect to a conventional optical information recording medium (sample 1-b in Example 1), it was about 0.4°. Thus, it was confirmed that when the second resin film 14 was provided, the amount of change in tilt by humidity could radically be improved.

TABLE 3

| Sample No. | Water absorption rate (wt. %) | Amount of change in tilt (°) |
|---|---|---|
| 2-a | 20 | 0.2 |
| 2-b | 16 | 0.2 |
| 2-c | 15.1 | 0.15 |
| 2-d | 12 | 0.14 |
| 2-e | 10.5 | 0.13 |
| 2-f | 10 | 0.12 |
| 2-g | 6.9 | 0.12 |
| 2-h | 4.3 | 0.12 |
| Conventional example | — | 0.4 |

Example 3

In Example 3, an optical information recording medium 1 according to the first embodiment was manufactured.

In this Example, samples were prepared in the same manner as the sample 1-a in Example 1 except that the thickness of the light transmission layer 14 was varied by setting the thickness at any of 600 μm, 500 μm, 400 μm, 300 μm, 100 μm and 50 μm, and samples were prepared in the same manner as the sample 1-b in Example 1 (herein, the thickness of the first resin film 13b was set at 25 μm) except that the thickness of the light transmission layer 14 was varied by setting the thickness at any of 600 μm, 500 μm, 400 μm, 300 μm, 100 μm and 50 μm. These samples were subjected to the corrosion test as in the Example 1.

As a result, in the sample in which the second resin film 13b was not provided, when the thickness of the light transmission layer 14 was about 400 μm or more, the corrosion resistant property was excellent, but when the thickness of the light transmission layer 14 was 300 μm or less, corrosion was observed in the information layer 12. This is thought to be because as the light transmission layer 14 becomes thinner, the larger amount of water enters from the outside.

On the other hand, in the sample provided with the second resin film 13b, even if the thickness of the light transmission layer 14 was 300 μm or less, no corrosion occurred, and even if the thickness of the light transmission layer 14 was 50 μm, the deterioration of the corrosion resistance was not observed.

In order to achieve high-density recording by increasing NA, it is necessary to form the light transmission layer 14 thinly. In this case, the thickness of the light transmission layer 14 is preferably 300 μm or less and more preferably 100 μm or less. Therefore, from the results of this Example, it was confirmed that the configuration of the present invention in which the second resin film 13b is provided was suitable to increase NA.

Example 4

In Example 4, an optical information recording medium 1 according to the first embodiment was manufactured.

In this example, samples 4-a to 4-h (five per each sample) being the same as the sample 1-a of Example 1 except the distance W between the end face of the second resin film 13b and the end face of the information layer 12 was varied. The values of the distances W in the samples 4-a to 4-h were shown in Table 4, respectively. Note here that the distance W was expressed with "+" when the end face of the second resin film 13b was positioned at the outer peripheral side of the end face of the information layer 12, and expressed with "−" when the end face of the second resin film 13b was positioned at the inner peripheral side of the end face of the information layer 12. Furthermore, the distance W was measured exactly by observing the end face of the information layer 12 and the end face of the second resin film 13b through an optical microscope capable of measuring the distance two dimensionally.

These samples 4-a to 4-h were subjected to a corrosion test in the same manner as in Example 1. Table 4 shows the relationship between the distance W and corrosion. Note here that since corrosion occurred in a circular shape in general, in table 4, the number of corrosion having a size of 50 μm or smaller in diameter and the number of corrosion having a size of 50 μm or larger in diameter were shown.

TABLE 4

| | | Number of corrosion (point) | |
|---|---|---|---|
| Sample No. | Distance W (mm) | Smaller than 50 μm in diameter | 50 μm or larger in diameter |
| 4-a | −0.1 | 1–3 | 1–2 |
| 4-b | 0 | 1–2 | 1–2 |
| 4-c | +0.05 | 1–2 | 1 |
| 4-d | +0.1 | 1 | 1 |
| 4-e | +0.15 | 1 | 0 |
| 4-f | +0.2 | 0 | 0 |
| 4-g | +0.25 | 0 | 0 |
| 4-h | +0.3 | 0 | 0 |

From the results mentioned above, it was confirmed that preferably the second resin film 13b was formed so as to cover the end face of the information layer 12 and more preferably the distance W was 0.2 mm or more.

Example 5

In Example 5, an optical information recording medium 1 according to the first embodiment was manufactured.

In this Example, samples 5-a to 5-d (five per each sample) being the same as the sample 1-a of Example 1 except the thickness H2 of the second resin film 13b were prepared. The values of the thickness H2 in the samples 5-a to 5-d were shown in Table 5. Furthermore, the thickness H2 was measured by using a white interference film thickness measurement device capable of measuring the film thickness by interference of light.

These samples 5-a to 5-d were subjected to a corrosion test in the same manner as in Example 1. Table 5 shows the relationship between the thickness H2 and corrosion. Note here that since corrosion occurred in a circular shape in general, in table 5, the number of corrosion having a size of 50 μm or smaller in diameter and the number of corrosion having a size of 50 μm or larger in diameter were shown.

TABLE 5

| Sample No. | Thickness H2 (μm) | Number of corrosion (point) | |
|---|---|---|---|
| | | Smaller than 50 μm in diameter | 50 μm or larger in diameter |
| 5-a | 2 | 0 | 0 |
| 5-b | 0.2 | 0 | 0 |
| 5-c | 0.1 | 1 | 0 |
| 5-d | 0.08 | 2–3 | 1 |

From the results mentioned above, it was confirmed that by setting the thickness H2 of the second resin film 13b at 0.2 μm or more, an excellent corrosion resistance was obtained.

Example 6

In Example 6, an optical information recording medium 2 according to the second embodiment was manufactured.

For a substrate 21, a polycarbonate substrate having a diameter of 120 mm and a central diameter of 10 mm was used. On one surface of this polycarbonate substrate, grooves were formed. An information layer 22 was formed of a reflective film (Ag—Pb—Co, thickness: 20 nm), a second protective film (ZnS—SiO$_2$, thickness: 20 nm), a recording film (Ge—As—Tb, 20 nm) and a first protective film (ZnS—SiO$_2$, thickness: 20 nm). A light transmission layer 24 was formed of polycarbonate so that the thickness was 78 μm. The first resin film 23a was formed of polymethyl acrylate so that the thickness H1 was 20 μm. The second resin film 13b was formed of an ultraviolet curable resin so that the thickness H2 was 1 μm. Herein, the ultraviolet curable resin contains 22 mol % of ethylene oxide modified bisphenol A-diacrylate, 30 mol % of tetrahydrofurfuryl acrylate and 25 mol % of dicyclopentenyl oxyethyl methacrylate as a main agent; 18 mol % of polyurethane diacrylate as a binder; and hydroxy cyclohexyl phenyl ketone as a photopolymerization agent. Two kinds of samples, that is, a sample 6-a satisfying the relationship D1<D2 and a sample 6-b satisfying the relationship D1>D2 (wherein D1 denotes a flexural modulus of elasticity of the first resin film 23a and D2 denotes a flexural modulus of elasticity of the second resin film 23b) were prepared. The values of D1 and D2 in each sample are shown in Table 6. Furthermore, for comparison, a sample (sample 6-c) in which only the first resin film 23a is provided as a resin layer 23 was prepared.

TABLE 6

| Sample No. | Flexural modulus of elasticity (Pa) | |
|---|---|---|
| | D1 | D2 |
| 6-a (D1 < D2) | 5 × 10$^4$ | 3 × 10$^5$ |
| 6-b (D1 > D2) | 5 × 10$^4$ | 2 × 10$^4$ |
| 6-c (only first resin film) | 4 × 10$^4$ | — |

Figure 3:
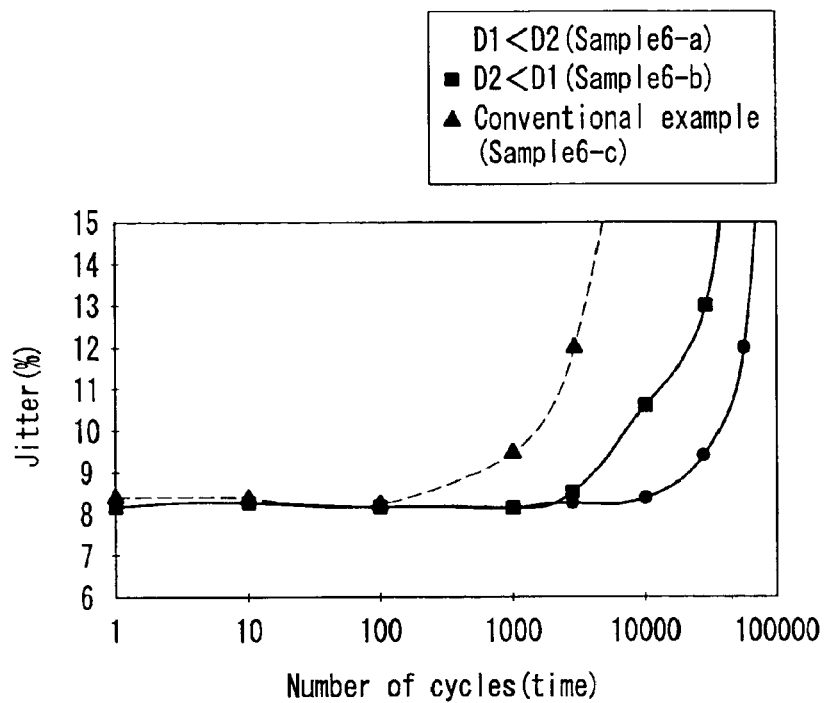
FIG. 3 is a graph showing a relationship between a number of cycles and jitter in an optical information recording medium according to Example 6 of the present invention.

As to the respective samples prepared as mentioned above, the recording/reproducing cycle property was confirmed. FIG. 3 shows the recording/reproducing cycle property of the respective samples. In the recording/reproducing cycle property shown in FIG. 3, the axis of abscissa shows the number of cycles of recording and reproducing with respect to the same place, and the axis of ordinates shows the value of jitter, which shows the quality of recording/reproducing signal. When the jitter value becomes larger, the recording/reproducing cannot be carried out. Note here that the signal information was recorded in a portion that is concave seen from the light transmission layer 24, that is, a groove region.

As shown in FIG. 3, it was confirmed that when the first resin film 23a and the second resin film 23b, each having a different flexural modulus of elasticity, were provided, the optical information recording medium having a more excellent recording/reproducing cycle property as compared with the conventional optical information recording medium was obtained. Furthermore, it also was confirmed that by setting the flexural modulus of elasticity D2 of the second resin film 23b to be larger than the flexural modulus of elasticity of D1 of the first resin film 23a, a more excellent recording/reproducing cycle property was obtained.

Example 7

In Example 7, an optical information recording medium 2 according to the second embodiment was manufactured.

In this Example, samples 7-a to 7-d were prepared in the same manner as in Example 6 except that the first resin film 23a was formed of polymethyl acrylate with the flexural modulus of elasticity thereof fixed at 5×10$^4$ Pa and the flexural modulus of elasticity D2 of the second resin film 23b was varied as shown in Table 7.

TABLE 7

| Sample No. | Flexural modulus of elasticity D2 (Pa) |
|---|---|
| 7-a | 1 × 10$^5$ |
| 7-b | 2 × 10$^5$ |
| 7-c | 3 × 10$^5$ |
| 7-d | 4 × 10$^5$ |

The recording/reproducing cycle properties of these samples were confirmed in the same manner as in Example 6. The results are shown in FIG. 4.

Figure 4:
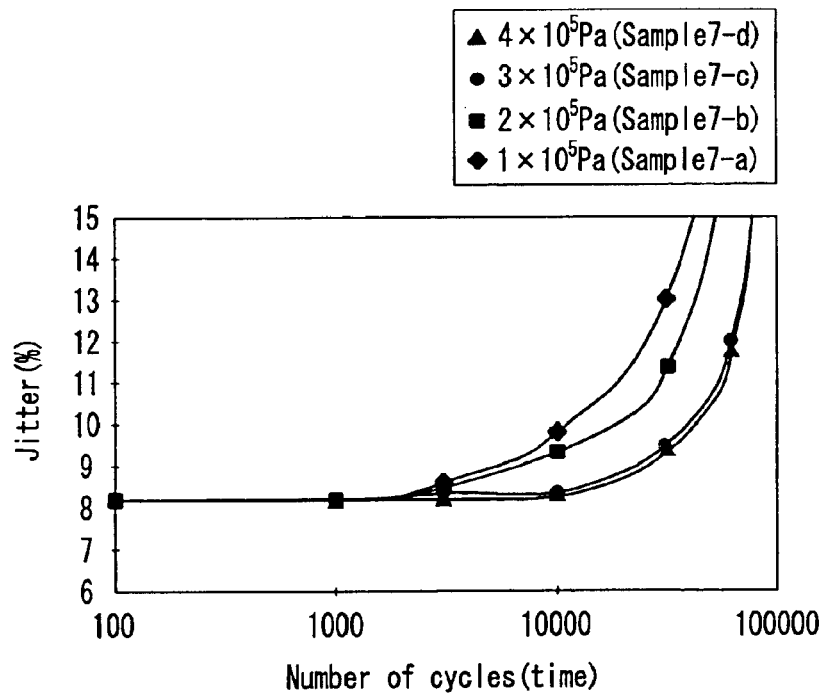
FIG. 4 is a graph showing the relationship between a number of cycles and jitter in an optical information recording medium according to Example 7 of the present invention.

As shown in FIG. 4, as the flexural modulus of elasticity D2 of the second resin film 23b is increased from 1×10$^5$ Pa to 1×10$^5$ Pa, a more excellent recording/reproducing cycle property was exhibited. When the flexural modulus of elasticity was 3×10$^5$ Pa or more, the jitter was substantially constant. This is thought to be because there is a point around 3×10$^5$ Pa in which the recording/reproducing cycle property becomes constant.

From the results mentioned above, it was confirmed that preferably the flexural modulus of elasticity of the second resin film 23b was 3×10$^5$ Pa or more.

Example 8

In Example 8, an optical information recording medium 2 according to the second embodiment was manufactured.

In this Example, samples of an optical information recording medium 2 similar to those in Example 6 in which the moduli of elasticity D1 and D2 are fixed at certain values and a conventional optical information recording medium (sample 6-c of Example 6 in which the second resin film 23b is not formed) with the thickness of the light transmission layer varied by setting the thickness at any of 600 μm, 500 μm, 400 μm, 300 μm, 100 μm and 50 μm were prepared. The recording/reproducing cycle properties of these samples were evaluated in the same manner as in Example 6. Note here that in this Example, the first resin film 23a was formed of polymethyl acrylate and the flexural modulus of elasticity D1 was fixed at $5 \times 10^4$ Pa and the second resin film 23b was formed of an ultraviolet curable resin and the flexural modulus of elasticity was fixed at $5 \times 10^4$ Pa. Herein, in the samples of the conventional optical information recording medium, the thickness H1 of the first resin film 23a was set at 25 μm.

As a result, as to a conventional sample in which the second resin film 23b was not provided, the recording/reproducing cycle property was excellent when the thickness of the light transmission layer 24 was about 400 μm or more. However, when the thickness of the light transmission layer 24 became 300 μm or less, the deterioration of the recording/reproducing cycle property was observed. This is thought to be because the thinner the light transmission layer 24 becomes, the more the first resin layer 23a is affected by heat, which causes the heat deformation, etc.

On the other hand, in the sample provided with the second resin film 23b, even if the thickness of the light transmission layer 24 was 300 μm or less, no deterioration of the recording/reproducing cycle property occurred. Furthermore, even if the thickness of the light transmission layer 24 was reduced, the same results were obtained.

In order to achieve the high-density recording by increasing NA, it is necessary to form the light transmission layer 24 thinly. In this case, the thickness of the light transmission layer 24 is preferably 300 μm or less and more preferably 100 μm or less. Therefore, it was confirmed from the result of this Example that the configuration of the present invention in which the second resin film 13b is provided was suitable to increase NA.

Example 9

In Example 9, an optical information recording medium 2 according to the second embodiment was manufactured.

In this Examples, samples were prepared in which the first resin film 23a was formed of polymethyl acrylate and its flexural modulus of elasticity was fixed at $5 \times 10^4$ Pa, and the second resin film 23b was formed of an ultraviolet curable resin film and its flexural modulus of elasticity was fixed at $3 \times 10^5$ Pa, and the thickness H2 was varied at any of 2.0 μm, 0.2 μm, 0.1 μm and 0.05 μm. Note here that the configuration other than the first resin film 23a and the second resin film 23b was the same as in Example 6.

The recording/reproducing cycle properties of these samples were confirmed in the same manner as in Example 6. The results are shown in FIG. 5.

Figure 5:
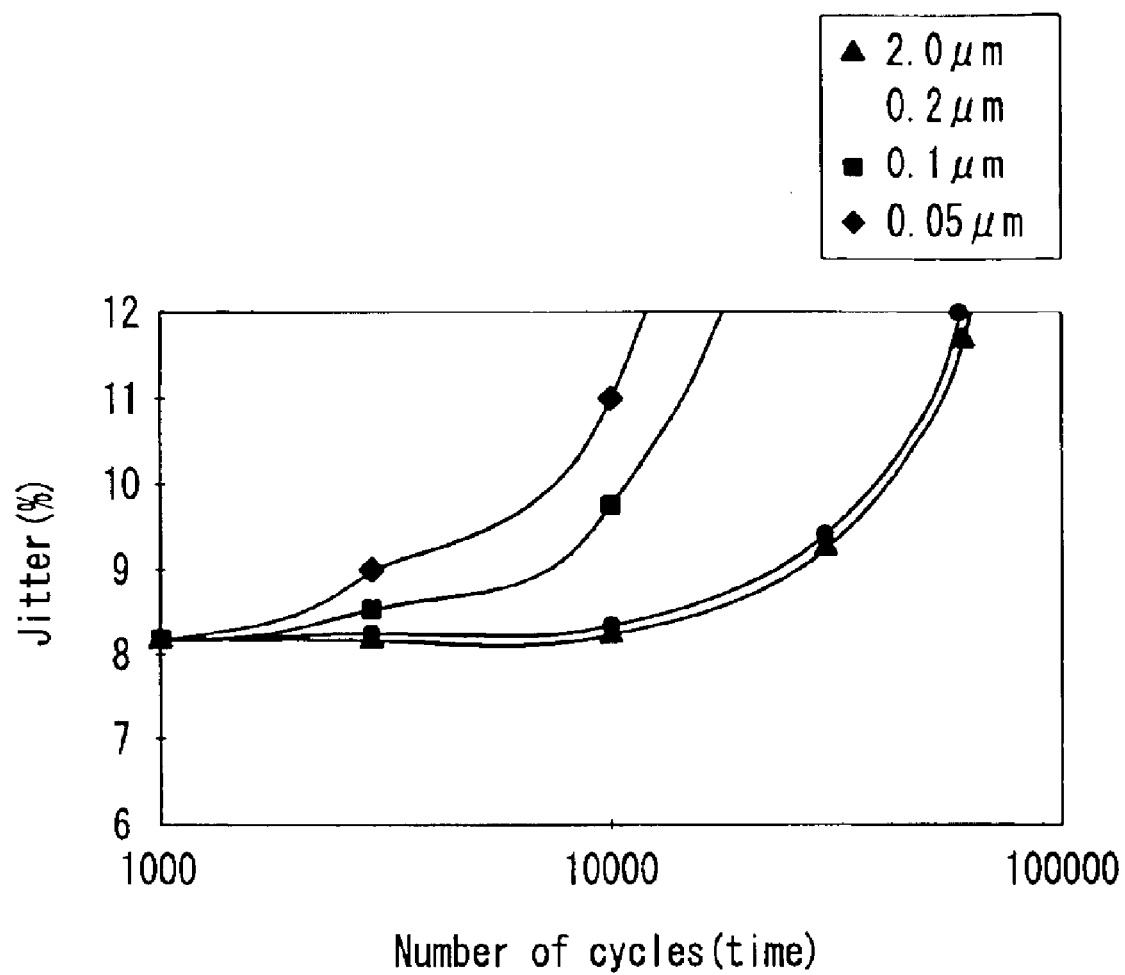
FIG. 5 is a graph showing a relationship between a number of cycles and jitter in an optical information recording medium according to Example 9 of the present invention.

As shown in FIG. 5, as to the recording/reproducing cycle property, the reduction of the thickness H2 affects the deterioration in degree of jitter, that is, the number of cycles in which jitter is rapidly increased in FIG. 5. As H2 is increased from 0.05 μm to 0.2 μm, a more excellent recording/reproducing cycle property is obtained. This is thought to be because as the second resin film 23b has a larger thickness, the heat diffusion effect can easily be obtained. Furthermore, when H2 was 0.2 μm or more, the recording/reproducing cycle property was substantially constant.

Example 10

In Example 10, an optical information recording medium 2 according to the second embodiment was manufactured.

In this Example, the same sample as in Example 6 was formed except that the first resin film 23a was formed of polymethyl acrylate and its flexural modulus of elasticity D1 was fixed at $5 \times 10^4$ Pa and the flexural modulus of elasticity D2 of the second resin film 23b was changed as shown in Table 8. Note here that the flexural modulus of elasticity D2 was controlled so as to have a predetermined value by selecting a material of acrylate resin used as a binder in the second resin film 23b, for example, by using a material of a bifunctional compound or a polyfunctional compound.

The amount of change in tilt by temperature with respect to these samples was measured, respectively. Table 8 shows the flexural modulus of elasticity and the amount of change in tilt by the temperature. The tilt by temperature represents a maximum value of the amount of change in tilt in the case where the temperature of the sample was changed from the state of room temperature to an environment at a temperature of 70° C.

TABLE 8

| Sample No. | Flexural modulus of elasticity D2 (Pa) | Amount of change in tilt (°) |
|---|---|---|
| 10-a | $1 \times 10^5$ | 0.8 |
| 10-b | $2 \times 10^5$ | 0.7 |
| 10-c | $3 \times 10^5$ | 0.5 |
| 10-d | $4 \times 10^5$ | 0.5 |
| Conventional example | — | 1.0 |

Table 8 shows that the amount of change in tilt by temperature changes depending upon the flexural modulus of elasticity of the second resin film 23b, but when the flexural modulus of elasticity is $3 \times 10^5$ Pa or more, the amount of change in tilt shows a constant value of 0.5°. This is because the flexural modulus of elasticity of the second resin film 23b was high, so that the occurrence of a tilt was suppressed due to the shrinkage of a medium. Similarly, the amount of change in tilt of the conventional optical information recording medium (i.e. optical information recording medium in which the second resin film 23b was not provided) was measured, it was about 1.0°. Thus, it was confirmed that by providing the second resin film 23b, the amount of change in tilt by temperature was radically improved.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. An optical information recording medium, comprising:
   a substrate with at least one selected from the group consisting of a groove and a pit formed on one surface thereof;
   at least one information layer provided on the surfaces of the substrate, the information layer comprising at least one selected from the group consisting of a recording film and a reflective film;
   a resin layer provided on the information layer; and
   a light transmission layer provided on the resin layer,
   wherein the resin layer comprises a first resin film and a second resin film disposed in this order from the side of the light transmission layer, and when a water absorption rate of the first resin film is represented by A1 and a water absorption rate of the second resin film is represented by A2, A1 and A2 satisfy: A1>A2.

2. The optical information recording medium according to claim 1, wherein the water absorption rate A2 of the second resin film is 10 wt. % or less.

3. The optical information recording medium according to claim 1, wherein the thickness of the light transmission layer is 100 μm or less.

4. The optical information recording medium according to claim 1, wherein the second resin film comprises at least an ultraviolet curable resin.

5. The optical information recording medium according to claim 1, wherein the information layer comprises a first protective film, the recording film, a second protective film and the reflective film disposed in this order from the side on which a laser beam is incident, the first protective film comprises ZnS, and the second resin film is provided in contact with the first protective film.

6. The optical information recording medium according to claim 1, wherein the pit is formed on the surface of the substrate, the information layer is made of the reflective film comprising at least one selected from the group consisting of Ag, Al and Si, and the second resin film is provided in contact with the reflective film.

7. The optical information recording medium according to claim 1, wherein the second resin film is provided so as to cover the end face of the information layer.

8. The optical information recording medium according to claim 7, wherein the distance W between the end face of the second resin film and the end face of the information layer is 0.2 mm or more.

9. The optical information recording medium according to claim 1, wherein when the thickness of the first resin film is represented by H1 and the thickness of the second resin film is represented by H2, H1 and H2 satisfy: H1>H2.

10. The optical information recording medium according to claim 9, wherein the thickness H2 of the second resin film is 0.2 μm or more and 0.5 μm or less.

11. The optical information recording medium according to claim 1, wherein the second resin film is formed by spin coating.

12. The optical information recording medium according to claim 1, wherein a plurality of information layers are provided between the substrate and the resin layer.

13. The optical information recording medium according to claim 1, wherein when the flexural modulus of elasticity of the first resin film is represented by D1 and the flexural modulus of elasticity of the second resin film is represented by D2, D1 and D2 are different from each other.

14. The optical information recording medium according to claim 13, wherein the flexural modulus of elasticity D1 of the first resin film and the flexural modulus of elasticity D2 of the second resin film satisfy: D2>D1.

15. An optical information recording medium, comprising:

a substrate with at least one selected from the group consisting of a groove and a pit formed on one surface thereof;

at least one information layer provided on the surfaces of the substrate, the information layer comprising at least one selected from the group consisting of a recording film and a reflective film;

a resin layer provided on the information layer; and a light transmission layer provided on the resin layer, wherein the resin layer comprises a first resin film and a second resin film disposed in this order from the side of the light transmission layer, and when the flexural modulus of elasticity of the first resin film is represented by D1 and the flexural modulus of elasticity of the second resin film is represented by D2, D1 and D2 are different from each other.

16. The optical information recording medium according to claim 15, wherein the flexural modulus of elasticity D1 of the first resin film and the flexural modulus of elasticity D2 of the second resin film satisfy: D2>D1.

17. The optical information recording medium according to claim 15, wherein the flexural modulus of elasticity D2 of the second resin film is $3 \times 10^5$ Pa or more.

18. The optical information recording medium according to claim 15, wherein the difference in the flexural modulus of elasticity between the first resin film and the second resin film is $1 \times 10^5$ Pa or more and $1 \times 10^7$ Pa or less.

19. The optical information recording medium according to claim 15, wherein the thickness of the light transmission layer is 100 μm or less.

20. The optical information recording medium according to claim 15, wherein the second resin film comprises at least an ultraviolet curable resin.

21. The optical information recording medium according to claim 15, wherein when the thickness of the first resin film is represented by H1 and the thickness of the second resin film is represented by H2, H1 and H2 satisfy: H1>H2.

22. The optical information recording medium according to claim 21, wherein the thickness H2 of the second resin film is 0.2 μm or more and 0.5 μm or less.

23. The optical information recording medium according to claim 15, wherein the information layer comprises a first protective film, the recording film, a second protective film and the reflective film disposed in this order from the side in which a laser beam is incident, the first protective film comprises ZnS, and the second resin film is provided in contact with the first protective film.

24. The optical information recording medium according to claim 15, wherein the pit is formed on the surface of the substrate, the information layer is made of the reflective film comprising at least one selected from the group consisting of Ag, Al and Si, and the second resin film is provided in contact with the reflective film.

25. The optical information recording medium according to claim 15, wherein the second resin film is formed by spin coating.

26. The optical information recording medium according to claim 15, wherein a plurality of information layers are provided between the substrate and the resin layer.

* * * * *